Oct. 10, 1950     C. E. TROUTMAN     2,525,383
MOLE TRAP
Filed March 30, 1946
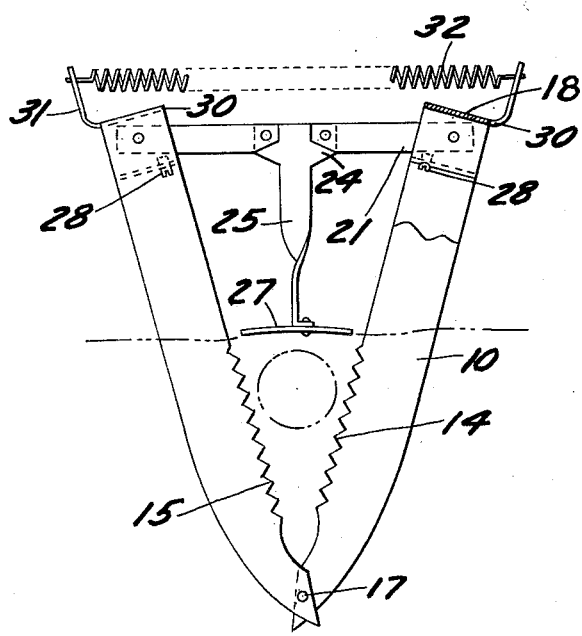
Fig. I
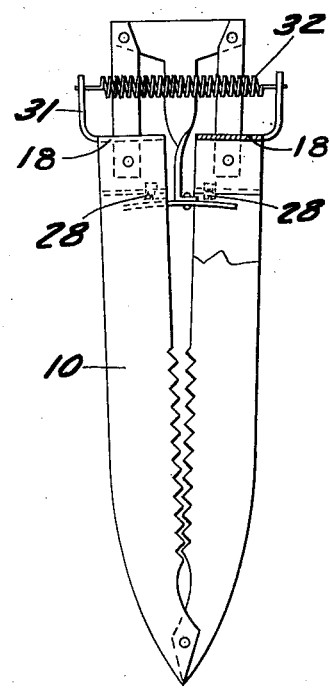
Fig. II
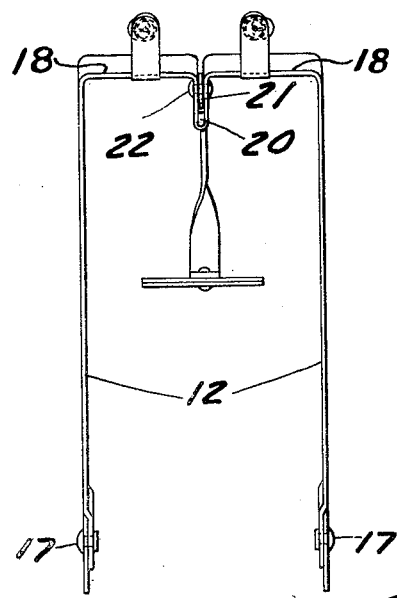
Fig. III
Chester E. Troutman
INVENTOR
BY Edmund B. Whitcomb
ATTORNEY Patented Oct. 10, 1950

2,525,383

UNITED STATES PATENT OFFICE 2,525,383

MOLE TRAP

Chester E. Troutman, Sylvania, Ohio

Application March 30, 1946, Serial No. 658,389

1 Claim. (Cl. 43—94)

This invention relates to an animal trap or mole trap which is of simplified construction but very effective in action.

One of the objects of the present invention is to produce a mole trap of this type which is made of stampings and in which the parts are made in duplicate to facilitate quantity production; to provide a quick acting positively operating trap of the scissors type; to provide a trip mechanism of the toggle type whereby the strong springs used in closing the trap are also used to "set" the releasable trip mechanism and the trap is self setting.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is an end elevation showing the trap in set position, portions shown in section;

Figure II is a similar view showing the jaws closed;

Figure III is a side elevational view.

Referring to Figures I and III, the main operating blades 10 are formed by a pair of similar U-shaped stampings 12, the lower ends being pointed for insertion into the ground and each leg also having saw tooth cutting edges 14 and 15. Each leg of one pair of jaws 12 is pivoted by a rivet 17 to the opposite pair as indicated in Figures III and I.

Each U-shaped jaw 12 has a connecting top bridge 18 and said bridge is also provided with a reversed fold or depression 20 to form a base to which the toggle levers 21 may be pivoted by a rivet 22. The other end of each lever 21 is pivoted to the upper enlarged end 24 of the releasing arm 25 which depends into the path of the mole. The lower end of arm 25 has an enlarged curved contact pad 27 which receives the impact of the earth raised as the mole passes through the trap and the arm 25 is thereby elevated to spring the jaws of the trap. The opposed sides of the U-shaped part 20 forms guides for the end portions of levers 21 thereby steadying the action and strengthening the trap. The bottom of the U fold 20 also forms means for retaining stops 28 to "setting" position which the toggle levers 21 assume. As shown in Figures I and II, this setting stop 28 consists of a screw threaded stud which may be screwed into and out of the bottom part of the U to adjust the setting position of said stop 28 to limit the position of the cross arms or toggle levers 21 which contact the stop 28 as indicated in Figure I when the trap is set.

Secured to each top or bridge of the U-shaped jaws 12 are two spring anchors 30 having a right angled, upward extension 31 having an eye to which one end of each of a pair of springs 32 is secured. The other end of each spring 32 is held in the ear of a similar anchor 30 on the other jaw. These springs not only form the power for closing the jaws with the animal trapped therein but springs 32 also hold the toggle levers in "set" position with the jaws 12 in open position until the same are released by an upward movement of lever or arm 25.

Before setting the trap it is understood that the ground must be tramped down to fill the dirt in the runway of the mole. In setting my trap the operator takes hold of the bridge 18 of each of the opposed jaws 12 and pulls them apart against the tension of springs 32 from the position of Figure II. The toggle levers 21 fall by gravity to just below the substantially horizontal position shown in Figure I or until the lower edges of levers 21 contact the setting stop 28. In this position I have shown in Figure I the mole run indicated in dotted lines as located between the open saw-toothed jaws. The pad 27 rests lightly or barely contacts the ground and the levers 21 and connecting head 24 shown in this position are just below dead center so that the springs 32 hold the trap in set position with the jaws 12 open, thus making the trap self setting. As a mole comes through the runway, the earth raises and contacts pad 27. This in turn raises head 24 and the inner ends of levers 21 of the toggle thus springing the trap and the powerful springs 32 operate to close the blades with their saw tooth edges 14 and 15 on the mole since there are two jaws, one ahead and one behind, the mole will be caught no matter from which direction he passes through the runway.

It will be noted that all parts are constructed of simplified stampings and identical parts are used throughout wherever possible.

It is apparent that, within the scope of the invention, modifications and different arrangements may be made other than is herein disclosed, and the present disclosure is illustrative merely, the invention comprehending all variations thereof.

What I claim is:

In an animal trap, two spaced integral U-shaped members, each having a bridge and cooperating jaws formed of cutting blades each having a pointed end for locating said trap in the ground; each bridge having a central, spaced armed, reversed bend; a toggle having levers, one end of each of said levers being pivoted to said bends in said bridges; a depending arm having an enlarged head end, the other ends of said levers being pivoted to said enlarged head, an actuating enlargement on the other end of said arm; and a pair of springs connecting said bridges.

CHESTER E. TROUTMAN.

REFERENCES CITED

The following references are of record in the file of this patent:

UNITED STATES PATENTS

| Number | Name | Date |
|---|---|---|
| 472,038 | Durston | Apr. 5, 1892 |
| 1,296,407 | Layton | Mar. 4, 1919 |
| 1,762,783 | Kascak | June 10, 1930 |
| 1,871,157 | Clayton | Aug. 9, 1932 |
| 2,048,135 | Mygrants | July 21, 1936 |